UNITED STATES PATENT OFFICE.

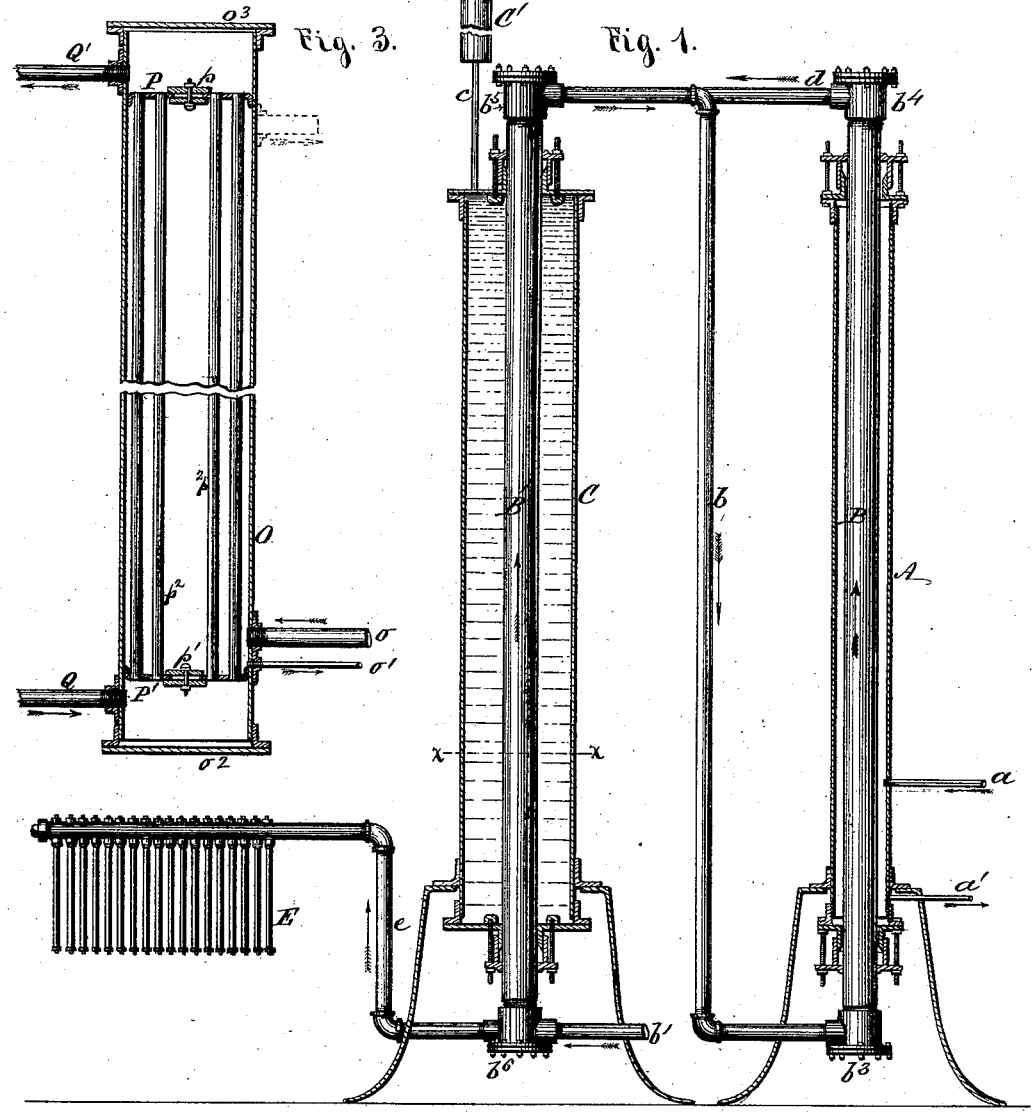

CASSIUS CARROLL PECK, OF NEW YORK, N. Y.

PROCESS OF PURIFYING WATER.

SPECIFICATION forming part of Letters Patent No. 373,802, dated November 22, 1887.

Application filed November 24, 1886. Serial No. 219,859. (No model.)

*To all whom it may concern:*

Be it known that I, CASSIUS CARROLL PECK, a citizen of the United States, residing in the city, county, and State of New York, have invented a certain new and Improved Process of Purifying Water and other Liquids; and I do hereby declare that the following is a full, clear, and exact description of the invention, which will enable others skilled in the art to which it appertains to make and use the same.

The object of my invention is to purify water, so as to better prepare it for domestic and manufacturing uses and for employment in steam-boilers, by removing such solid matters as are held in suspension, and also such as are at first held in solution, but which afterward assume solid forms through being subjected to the degree of heat commonly present in steam-boilers, the same process being also applicable to the purification of other liquids in which solids held in solution can be precipitated on being subjected to a temperature of about 300° Fahrenheit.

It is well known that solid matter held in suspension can be almost wholly removed from water by filtration through beds of sand, charcoal, and coke, or through plates of certain varieties of natural stone, or through walls of unglazed porcelain or baked clay. It is also common to precipitate carbonate of lime by heating water slightly above its boiling-point, and even the sulphate of lime, together with various carbonates and sulphates, have been precipitated by heating water to a much higher temperature, and the solid matters formed by dissociation of the acids, &c., which held them in solution, have been removed by filtering the water while hot. Water which has been subjected to a temperature of about 300° Fahrenheit and then immediately filtered under considerable pressure through a suitable medium, like those above mentioned, will be almost entirely freed of such substances as prove injurious in boilers and for most other uses—such as the sulphates or carbonates of magnesia, alumina, sodium, lime, iron, &c.

The principal difficulty heretofore experienced in making use of this efficient method of purifying water has been excessive cost, due to expenditure of heat in conducting the process. Apparatus heretofore devised in this connection has been found inconvenient in use and not suitable for employment in purifying large quantities of water. It is the office of my invention to remove these difficulties. The process is divided into three steps, namely: first, heating the water to be purified to the temperature required for precipitating the solid matters which it may hold in solution and which can be precipitated by this means; second, in cooling to the natural temperature of the feed-water the water which has been heated, and by means of the supply which replaces the water which leaves the heater; and, third, in filtering the water which has been heated and then cooled.

In the drawings, Figure 1 is an elevation, partly in section, of apparatus suitable for performing the three operations above named. Fig. 2 is a cross-section through line *x x*, Fig. 1, of what I shall term the "cooler," to distinguish it from the heater, although this so-called cooler heats the water-supply in the process of cooling the water which has been heated; and Fig. 3 is a central vertical section of another form of heater, which may also be adapted for use as a cooler.

The heater consists of an outer shell or jacket, A, Fig. 1, which surrounds a pipe, B, containing the water to be heated. The annular space between jacket A and pipe B is filled with steam, usually of not less than fifty pounds' pressure above the atmosphere, which is supplied through pipe *a*, the pipe *a'* being for return of water of condensation formed from the steam. Through pipe *b* pipe B is connected with pipe B' in cooler C. The cooler also contains pipe D, (shown in Fig. 2,) which communicates with the upper end of pipe B in heater A by pipe *d*. The lower end of pipe D connects with filter E by pipe *e*.

The operation is as follows: Cooler C is first filled with some liquid, preferably one which will not boil or form vapor pressure at the temperature of steam in heater A. For this purpose oil, glycerine, or water charged with some salt—such as chloride of calcium—are suitable. The liquid is introduced into cooler C through expansion-chamber C' and pipe *c*. The water or other liquid which is to be treated is pumped or otherwise forced through pipe *b'* into pipe B', in which it gradually rises to the top, and is thence conveyed to pipe B in heater A by pipe *b*. As the water rises slowly through pipe B it becomes heated, and before passing from the top end of said pipe has attained the temperature of the steam which fills the annular space between jacket A and pipe B. Small pipe $d$ conducts the highly-heated water to pipe D in cooler C. In slowly descending this pipe the water gradually gives off its heat to the liquid medium which fills the cooler, and at the lower end enters pipe $e$ at approximately the same temperature as the cold feed-water which enters the cooler through pipe $b'$. Pipe $e$ delivers the water to filter E under nearly the same pressure as the steam in heater A. This pressure being usually from fifty to eighty pounds to the square inch above that of the atmosphere, forces the water through the walls of the porcelain tubes which constitute the filter, while all solid matter is retained in said tubes. The purified water is then conducted in any convenient manner to a suitable receptacle.

The filter may consist of as many tubes or as many rows of tubes as it is found necessary or convenient to employ. The special construction of the filter will not be described here, as it will form the subject of a separate application for patent.

I do not confine myself to the special kind of filter shown, as any filter adapted for working under a considerable head or pressure of water may be employed for removal of sediment. Neither is my process restricted to the exact forms of heater and of cooler shown in Figs. 1 and 2, for the proportions and shapes of these may be much varied while conducting the water under treatment through the same series of steps. This is illustrated in Fig. 3, which is a form that may be adapted for use as either a cooler or a heater. Thus, if used as a heater, steam is introduced into shell O by pipe $o$, and water of condensation returned by pipe $o'$. Steam therefore fills the space between the tube-plates P P'. Water to be heated enters the space between tube-plate P and head $o^2$ through pipe Q, and, flowing upward through tubes $p^2$ into the space between tube-plate P and head $o^3$, finds exit through pipe Q'. When used as a cooler, pipe $o'$ is not needed. The heated water which is to be cooled enters by pipe Q', passes downward through pipes $p^2$, and away to filter E through pipe Q, while cold water enters by pipe $o$, and, rising upward through the space included between tube-plates P P', flows away to the heater A by the pipe shown in dotted lines.

Provision is made for access to the interior for cleaning or repairs by removal of heads $o^2$ $o^3$, which are secured by bolts, and by taking out the hand-hole plates $p$ $p'$.

In the apparatus shown in Fig. 1 pipes B B' are cleaned by unbolting and removing the plates on heads $b^3$ $b^4$ $b^5$ $b^6$. Pipe D, Fig. 2, is constructed like pipe B', and is cleaned in the same manner. The form of cooler shown in Fig. 1 can be more conveniently cleaned than that shown in Fig. 3, and cooler C has been designed with special reference to securing convenience in cleaning. The amount of sediment deposited in pipes B B' D is small, as the current carries most solid matters contained in the water over into the filter.

I am aware that water has been heated by direct contact with live steam, then, while in a highly heated state, passed through a filter constituting a part of the heater, and thence conducted through a cooler, in which it is cooled, by feed-water on the passage of the latter to the heater. Such an arrangement is not the equivalent of my invention. Heating water or other liquids which are to be purified by mingling with them live steam is essentially different in manner and result from heating with steam through the medium of thin metallic walls, which prevent commingling of the steam with the water or other liquid; and filtering liquids when heated so as to have a considerable vapor-tension and a temperature of nearly 300° Fahrenheit and at the same time restoring in the feed-liquid heat which escapes in liquid discharged from the heater require more complicated and less easily managed apparatus than that needed in my process; also, it is not possible to utilize the full amount of steam-pressure in the heater for forcing water rapidly through a filter and at the same time return in the feed-water heat conveyed away in water passing from the heater when the water under treatment is filtered in a highly-heated state.

In my process of purifying liquids by first heating them above their boiling-points, then cooling them by means of the feed-liquid, and then filtering them the full amount of pressure or tension possessed by vapors of the liquids when passing through the heater is available for forcing the cooled liquids through the filter, thus making the process rapid, effective, and economical.

What I claim as my invention, and desire to secure by Letters Patent, is—

1. The process hereinbefore described of purifying water and other liquids, consisting in first heating the liquid above its boiling-point, then cooling it by causing it to impart its excess of heat to the feed-liquid, which is made to move in opposite direction to the liquid which passes away from the heater, and, lastly, filtering the liquid which has been thus heated and then cooled, substantially in the manner and for the purpose described.

2. The process described of effecting an exchange of temperatures between the supply and the discharge currents of a liquid which has been heated, consisting in conducting said currents in opposite directions through a body of liquid which, by circulation and contact, conveys the excess of heat from one current to the other current, substantially in the manner and for the purpose described.

CASSIUS CARROLL PECK.

Witnesses:
L. B. PECK,
W. L. DEGRAW.